(12) United States Patent
Lee et al.

(10) Patent No.: US 7,665,573 B2
(45) Date of Patent: Feb. 23, 2010

(54) VEHICLE'S STEERING WHEEL ROTATION ANGLE SENSING DEVICE

(75) Inventors: Seag-Woo Lee, Gunpo-Si (KR); Chul Nam, Anyang-Si (KR); Jae Woo Pyo, Seoul (KR); Min Seok Jeon, Seoul (KR)

(73) Assignee: Daesung Electric Co., Ltd., Ansan-Si (KR)

( * ) Notice: Subject to any disclaimer, the term of this patent is extended or adjusted under 35 U.S.C. 154(b) by 285 days.

(21) Appl. No.: 11/923,812

(22) Filed: Oct. 25, 2007

(65) Prior Publication Data

US 2008/0110690 A1  May 15, 2008

(30) Foreign Application Priority Data

Nov. 15, 2006  (KR) .................. 10-2006-0112601

(51) Int. Cl.
 *B62D 5/04* (2006.01)
 *H01L 43/00* (2006.01)
(52) U.S. Cl. .................. 180/444; 180/443; 324/207.2
(58) Field of Classification Search .................. 180/443, 180/444, 446; 324/207.2
 See application file for complete search history.

(56) References Cited

U.S. PATENT DOCUMENTS 5,088,319 A * 2/1992 Hirose et al. ............. 73/117.02
6,272,912 B1 * 8/2001 Sano ........................ 73/117.02
7,562,591 B2 * 7/2009 Lee ......................... 73/862.331
2008/0127755 A1 * 6/2008 Kim ........................ 73/865.9

FOREIGN PATENT DOCUMENTS

KR       20-0423133      7/2006
KR     10-2006-0133704   12/2006
KR       10-0671014      1/2007

* cited by examiner

*Primary Examiner*—Lesley Morris
*Assistant Examiner*—Marc A Scharich
(74) *Attorney, Agent, or Firm*—IPLA P.A.; James E. Bame

(57) ABSTRACT

Present invention of vehicle's steering wheel rotation angle sensing device comprises, rotor rotating connected with steering shaft transmitting manipulation power to vehicle's wheel; main gear rotating connected with said rotor; first rotation gear and second rotation gear rotating with said main gear; first magnetic body and second magnetic body rotated in same rotation ratio with first rotation gear and second rotation gear connected with them individually, formed in hexahedral shape in which upper surface is larger than opposite bottom surface; first sensor and second sensor sensing phase change caused by rotation of said first magnetic body and second magnetic body; PCB substrate comprising said first sensor and second sensor and various terminals and pins; housing.

By present invention it is possible to prevent magnetic body from moving freely to vertical direction without using adhesive agent, and to manufacturing angle sensing device without process of attaching the magnetic body to rotation gear, so total cost and time for manufacturing it also can be diminished.

15 Claims, 8 Drawing Sheets

VEHICLE'S STEERING WHEEL ROTATION ANGLE SENSING DEVICE

CROSS-REFERENCE TO RELATED APPLICATIONS

This application claims priority from Korean Patent Application No. 2006-112601, filed on Nov. 15, 2006 in the Korean Intellectual Property Office, the disclosure of which is incorporated herein by reference.

FIELD OF INVENTION

This invention is related to vehicle's steering wheel rotation angle sensing device, particularly vehicle's steering wheel rotation angle sensing device in which magnetic bodies are prevented from moving freely to vertical direction due to trapezoid cross sections of them which are assembled to rotation gear, and when gear teeth of main gear and gear trough of first rotation gear are gone in gear with, gear teeth of second gear is rotated by going in gear with gear trough of said main gear, so that gear backlash is diminished.

BACKGROUND ART

In general, direction control apparatus used in automobile is a device for control direction of it according to driver's intention, and it comprises steering wheel, steering shaft connected to said steering wheel for transmitting operating force, and steering wheel rotation angle sensing device assembled to the steering shaft for sensing steering wheel's rotation angle.

And, vehicle's steering wheel rotation angle sensing device uses magnetic bodies and magnetic sensors for sensing magnetic power of them in said steering wheel's rotation.

Here, conventional magnetic body of vehicle's steering wheel rotation angle sensing device is formed of circular shape and assembled to rotation gear, said magnetic body is not firmly assembled to the rotation gear, so said magnetic body moves freely apart from the rotation gear, and disadvantage of calculation error about rotation angle due to magnetic power variation was occurred.

To solve said problem, conventionally adhesive agent was used in bonding magnetic body to rotation gear.

But, in said bonding method, when the magnetic body rotates in long time, bonding power of said adhesive agent diminishes so that the magnetic body may be detached from the rotation gear, and also bonding process must be added in manufacturing process, it takes more time and manufacturing cost increases in the process.

In the meanwhile, in conventional vehicle's steering wheel rotation angle sensing device when said rotation gear rotates, gear teeth of said rotation gear are in contact state, but gap is occurred between gear tooth of one rotation gear and gear trough of the other rotation gear, so that one rotation gear must rotate more for the gap and power transmission efficiency is lessened by the gap(backlash).

Said backlash is an obstacle for exact rotation angle sensing.

SUMMARY OF INVENTION

Accordingly, the object of the invention is to serve vehicle's steering wheel rotation angle sensing device preventing magnetic body from moving freely by rotation slip and moving freely to vertical direction without using adhesive agent by forming the vertical cross section of the magnetic body in trapezoid shape.

Also, another object of the invention is to serve vehicle's steering wheel rotation angle sensing device which can diminish backlash by the condition that when the gear teeth of main gear and gear trough of first rotation gear are gone in gear with, gear teeth of second gear is rotated by going in gear with gear trough of said main gear.

DETAILED DESCRIPTION

Figure 1:
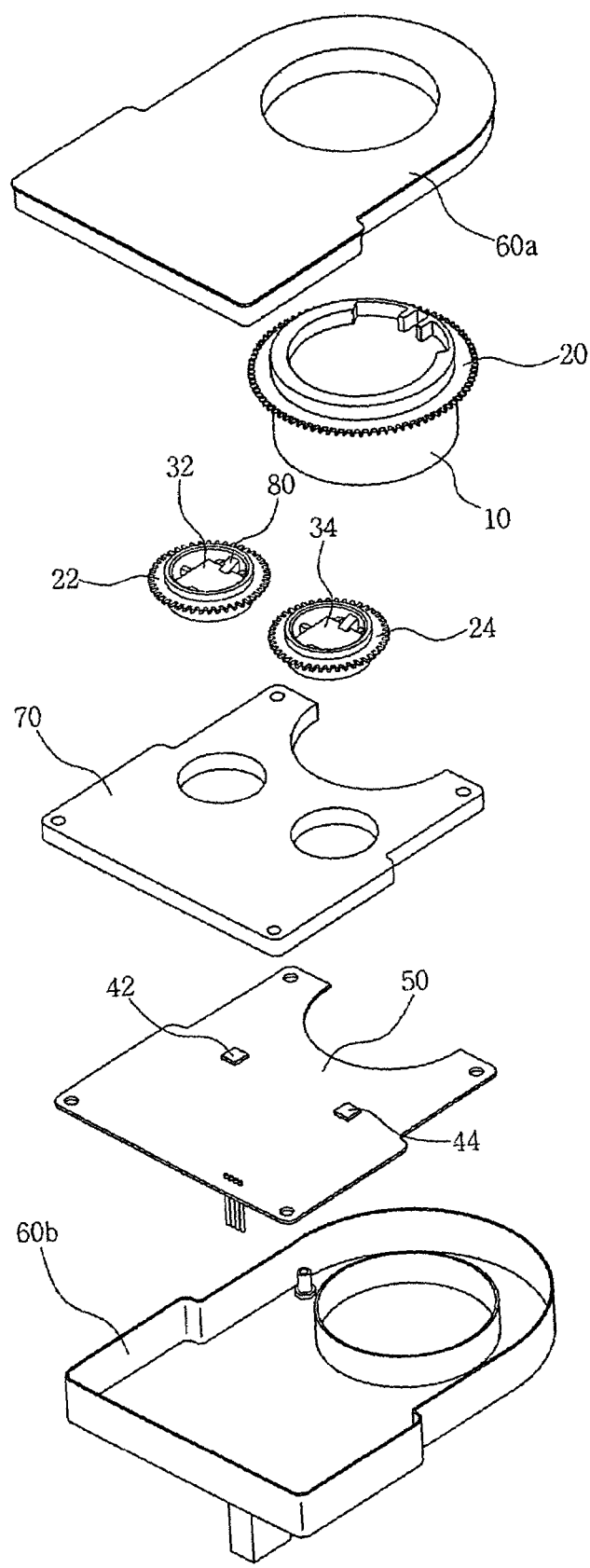
FIG. 1 is perspective view of disassembled vehicle's steering wheel rotation angle sensing device of the present invention.

This invention is made to solve said problem, and is characterized in that magnetic body is made in trapezoid shape, and when gear teeth of main gear and gear trough of first rotation gear are gone in gear with, gear teeth of second gear is rotated by being gone in gear with gear trough of said main gear.

To achieve said object present invention of vehicle's steering wheel rotation angle sensing device comprises, rotor rotating in connection with steering shaft transmitting manipulation power to vehicle's wheel; main gear rotating in connection with said rotor; first rotation gear and second rotation gear going in gear with said main gear; first magnetic body and second magnetic body rotating in same rotation rate with the first rotation gear and the second rotation gear connected with them individually, formed in hexahedral shape in which upper surface is larger than opposite bottom surface; first sensor and second sensor sensing phase change caused by rotation of said first magnetic body and second magnetic body; PCB substrate comprising said first sensor and second sensor and various terminals and pins; housing.

Here, vertical cross section of said first magnetic body and second magnetic body can be trapezoid Preferably, one of two vertical cross sections of said first magnetic body and second magnetic body can be trapezoid shape and the other can be tetragonal shape.

And, said first rotation gear and second rotation gear can further comprise magnetic body receiving part individually to receive said first magnetic body and second magnetic body made in trapezoid shape of vertical cross section and to prevent them from slipping.

Here, said first rotation gear and second rotation gear individually can further comprise locking part of protrusion shape to lock the received first magnetic body and second magnetic body.

Preferably, said vehicle's steering wheel rotation angle sensing device can further comprise gear receiving part to receive said main gear, said first rotation gear, said second gear.

Here, said housing can be divided into upper housing and lower housing.

Also, said upper housing can further comprise moving freely preventing part to prevent said first magnetic body and said second magnetic body from moving freely.

Preferably, when said gear teeth of main gear go in gear with gear trough of said first rotation gear on connecting line between shaft of said main gear and shaft of said first rotation gear, said gear trough of main gear can go in gear with gear teeth of said second rotation gear on connecting line between shaft of said main gear and shaft of said second rotation gear.

Here, said PCB substrate can calculate total rotation angle based on phase change of magnetic poles(N, S) caused by rotation of said first magnetic body and second magnetic body sensed by said first sensor and second sensor.

Also, said first sensor and second sensor can be AMR (Anisotropic Magnetic Resistor) sensor.

Or, said first sensor and second sensor can be GMR(Giant Magnetic Resistor) sensor.

Preferably, said first sensor and second sensor can be installed spaced from said first magnetic body and second magnetic body over than 0 millimeter(mm) and less than 20 millimeter(mm).

And, said first rotation gear and second rotation gear has different radius from each other, and generates sine wave signals of different cycle when rotates in the condition of going in gear with said main gear.

Here, said first rotation gear and first magnetic body or said second rotation gear and second magnetic body can be formed in one body.

Hereinafter, present invention is described in detail with attached drawings.

Figure 2:
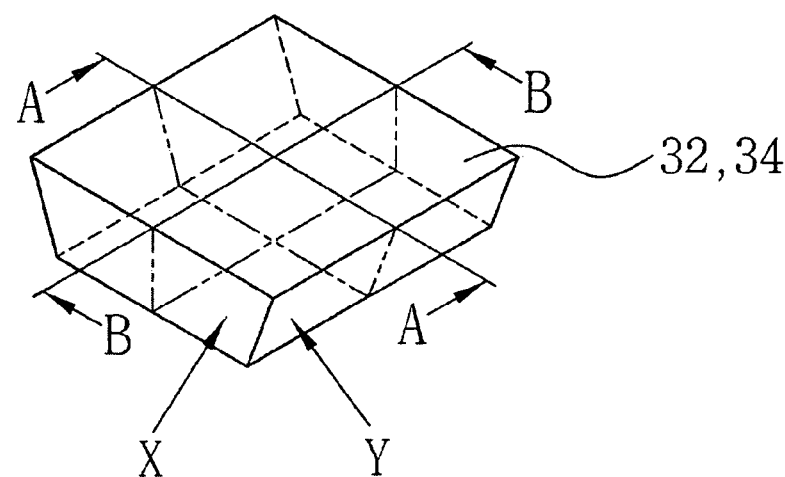
FIG. 2 is perspective view and side cross section view of magnetic body.
Figure 2:
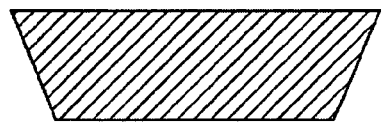
Figure 2:
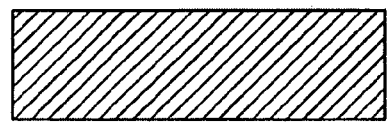

Referring to FIG. 2, present invention of vehicle's steering wheel rotation angle sensing device comprises, rotor(10) rotating in connection with steering shaft transmitting manipulation power to vehicle's wheel; main gear(20) rotating in connection with said rotor(10); first rotation gear(22) and second rotation gear(24) going in gear with said main gear(20); first magnetic body(32) and second magnetic body(34) rotating in same rotation rate with first rotation gear(22) and second rotation gear(24) connected with them individually, formed in hexahedral shape in which upper surface is larger than opposite bottom surface; first sensor(42) and second sensor(44) sensing phase change caused by rotation of said first magnetic body(32) and second magnetic body(34); PCB substrate(50) comprising said first sensor(42) and second sensor(44) and various terminals and pins; housing(60).

Here, said first rotation gear(22) and second rotation gear (24) can further comprise magnetic body receiving part(90) individually to receive said first magnetic body(32) and second magnetic body(34) made in trapezoid shape of vertical cross section to prevent slipping.

And, said first rotation gear(22) and second rotation gear (24) individually can further comprise locking part(80) of protrusion shape to lock the received first magnetic body(32) and second magnetic body(34).

And, said vehicle's steering wheel rotation angle sensing device can further comprise gear receiving part(70) to receive said main gear(20), said first rotation gear(22), said second gear(24).

And, said upper housing(60a) can further comprise moving freely preventing part(62) to prevent said first magnetic body(32) and said second magnetic body(34) from moving freely.

Hereinafter, each component is described in detail.

Referring to FIG. 1, rotor(10) connected with steering shaft rotates in housing(60).

Main gear(20) is fixed on outer surface of said rotor(10), when said rotor(10) rotates said main gear(20) also rotates with it(10).

Said rotor(10) can, also be formed in one body with said main gear(20).

Said rotor(10) is received in gear receiving part(70) in the state of connection with said main gear(20), when said rotor (10) and main gear(20) rotate said first rotation gear(22) and second rotation gear(24) rotate with them.

Said rotor(10) is connected to steering shaft directly or indirectly. For example, connection by pin or fitting the steering shaft into said rotor(10) is available. Or, fixing by making use of sleeve(not shown) or bushing(not shown) is also available.

Main gear(20) is fixed to said rotor(10) and when said rotor(11) rotates said main gear(20) rotates in same rotation rate with it.

Said main gear(20) goes in gear with first rotation gear(22) and second rotation gear(24). Namely, as shown in FIG. 6, when said gear teeth(20-1) of main gear(20) go in gear with gear trough(22-1) of said first rotation gear(22) on connecting line between shaft of said main gear(20) and shaft of said first rotation gear(22)(A), said gear trough(20-2) of main gear(20) can go in gear with gear teeth(24-1) of said second rotation gear(24) on connecting line between shaft of said main gear and shaft of said second rotation gear(B).

Here, when backlash occurs between said main gear(20) and first rotation gear(22) by counterturn of said main gear (20), contact state between gear teeth and trough of said main gear(20) and second rotation gear(24) is different from contact state between main gear(20) and first rotation gear(22), so counterturn rotation is possible and backlash can be diminished.

Figure 6:
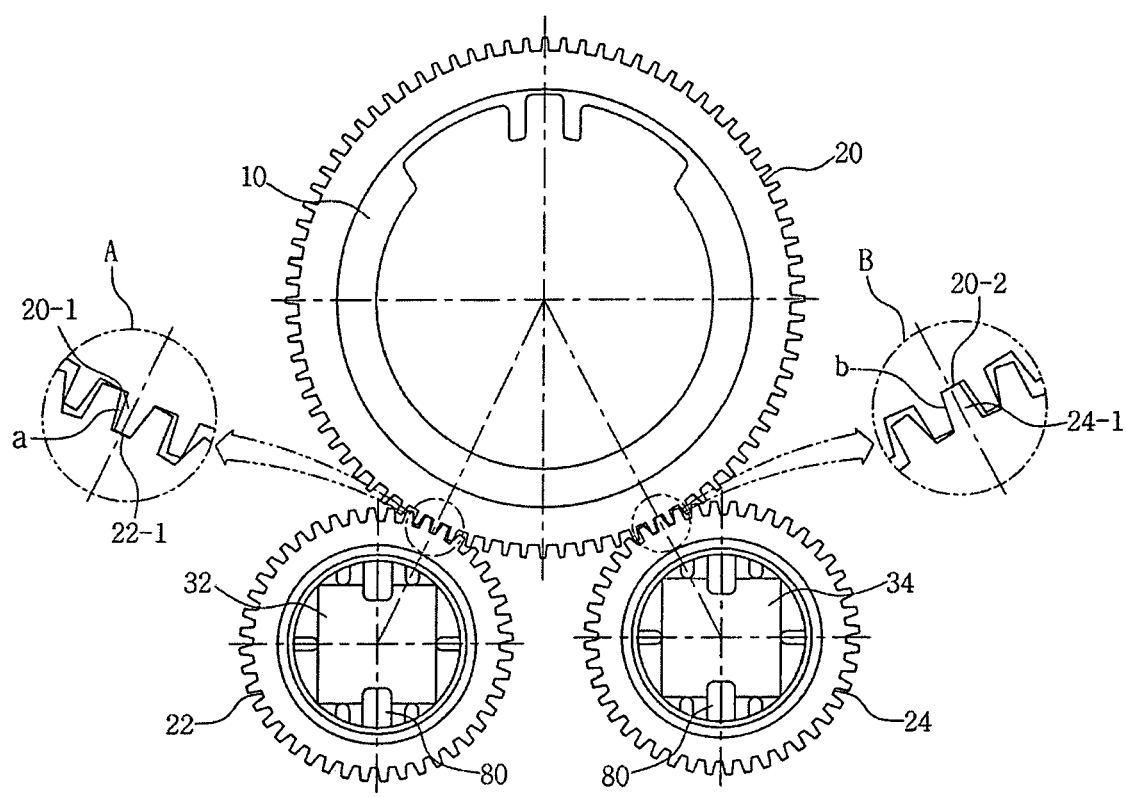
FIG. 6 is top view of assembled main gear and first rotation gear and second rotation gear.

Namely, as shown in FIG. 6, when said main gear(20) rotates clockwise direction after it(20) rotated counterclockwise direction, by the space(a) between gear teeth(20-1) of main gear and trough(22-1) of said first rotation gear, at the constant when the main gear(20) rotates to counterturn power cannot be transmitted constantly between said main gear(20) and first rotation gear(22) by backlash.

However, in this case, gear trough of main gear(20-2) which goes in gear with second rotation gear(24) contacts with gear teeth(24-1) of said second rotation gear, at the constant that said main gear(20) rotates to clockwise direction(counterturn) power can be transmitted without backlash.

And, said second rotation gear(24) generates sine wave and backlash can be diminished than conventional steering wheel rotation angle sensing device.

In the meanwhile, it is also possible that when said gear trough(20-2) of main gear(20) goes in gear with gear teeth of said first rotation gear(22) on connecting line between shaft of said main gear(20) and shaft of said first rotation gear(22), said gear teeth(20-1) of main gear(20) can go in gear with gear trough of said second rotation gear(24) on connecting line between shaft of said main gear and shaft of said second rotation gear.

And, said main gear(20) can be fixed to rotor(10) in various ways.

For example, main gear(20) can be fitted into fitting part (80) formed at one side of rotor(10), or can be fixed by adhesive means like double-stick.

Anyway main gear rotates at same rotation rate with rotor (10). And, said main gear can be formed in one body with said rotor(10).

Here, said main gear(20) is received in gear receiving part(70) and rotates at same rotation rate with rotor(10), and goes in gear with first rotation gear(22) and second rotation gear(24).

And, said main gear(20) is received in housing(60) in state of being received in said gear receiving part(70) and goes in gear with said first rotation gear(22) and second rotation gear(24).

Said first rotation gear(22) goes in gear with said main gear(20) and rotates to opposite direction of this main gear(20).

Figure 3A:
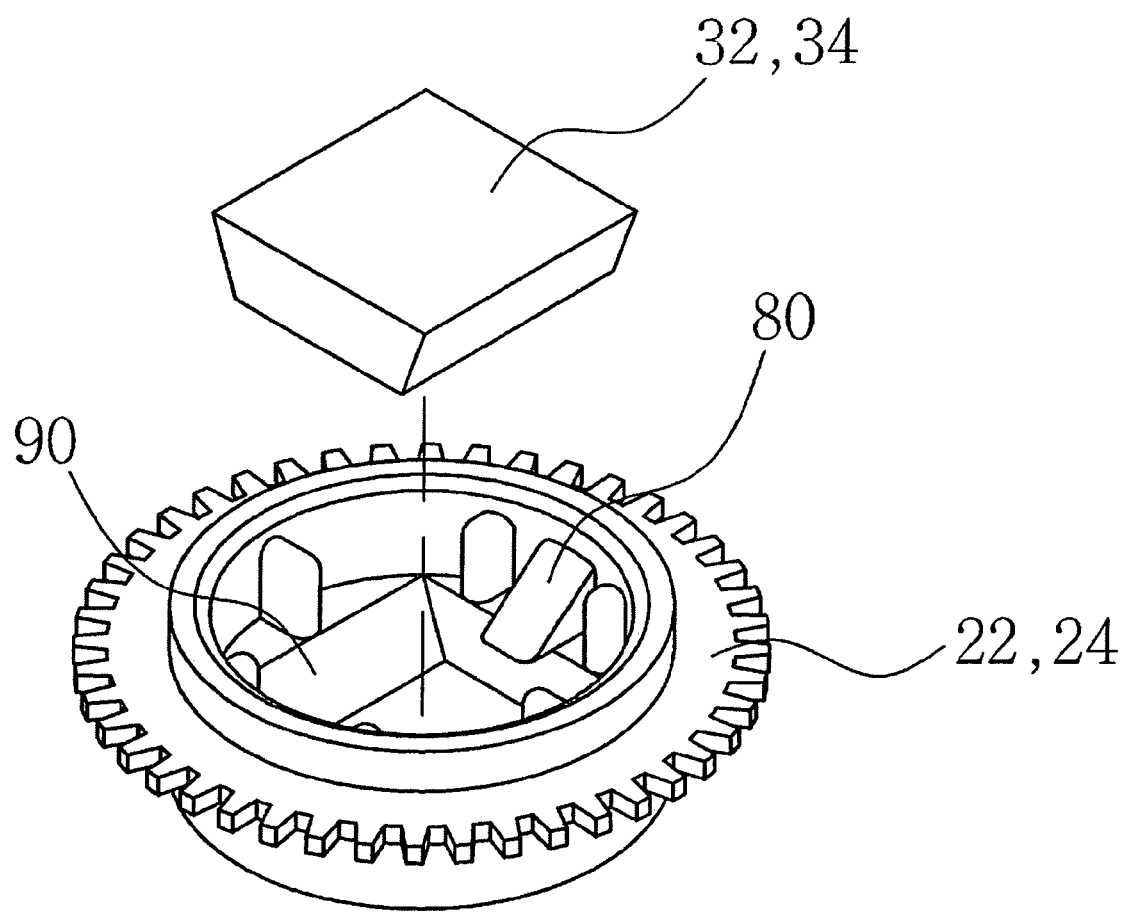
FIG. 3a is perspective view of rotation gear and magnetic body.
Figure 3B:
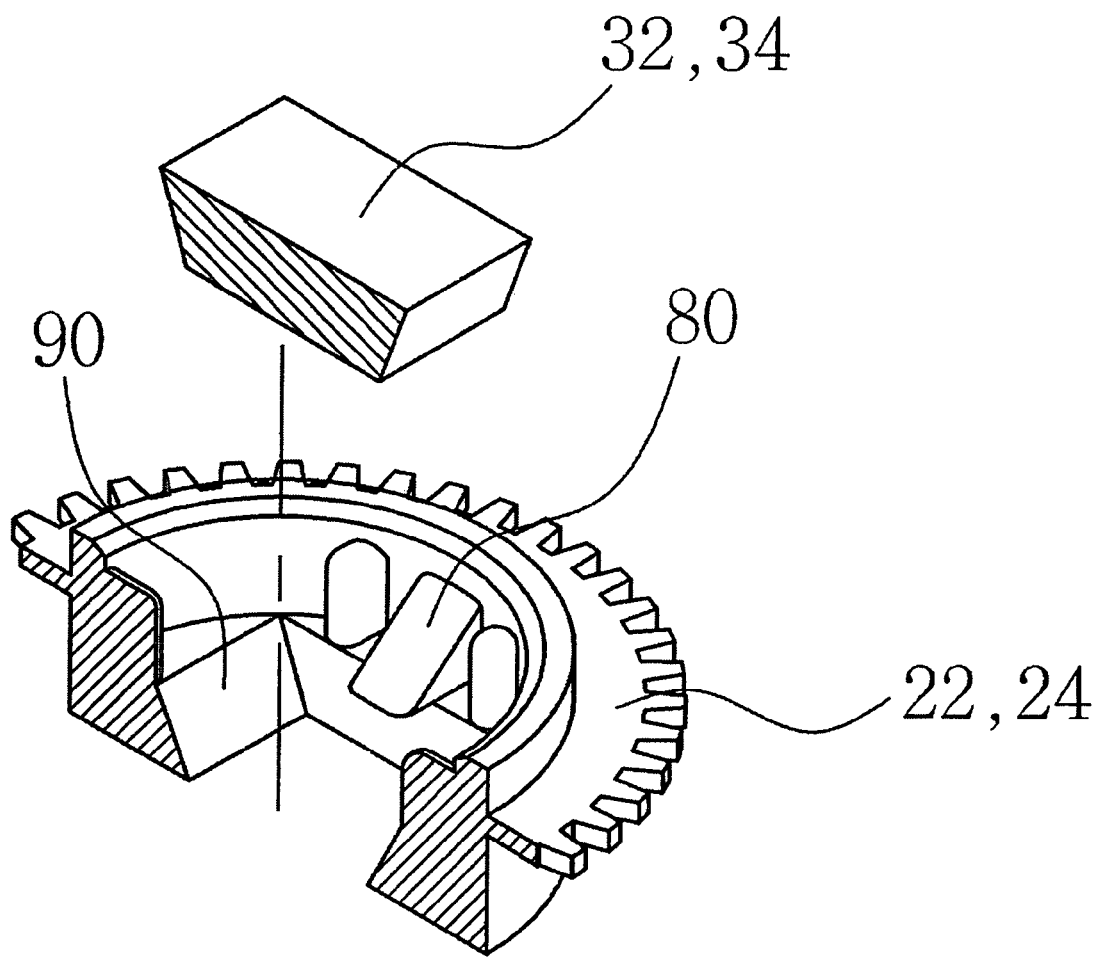
FIG. 3b is perspective cross section view of rotation gear and magnetic body.
Figure 4A:
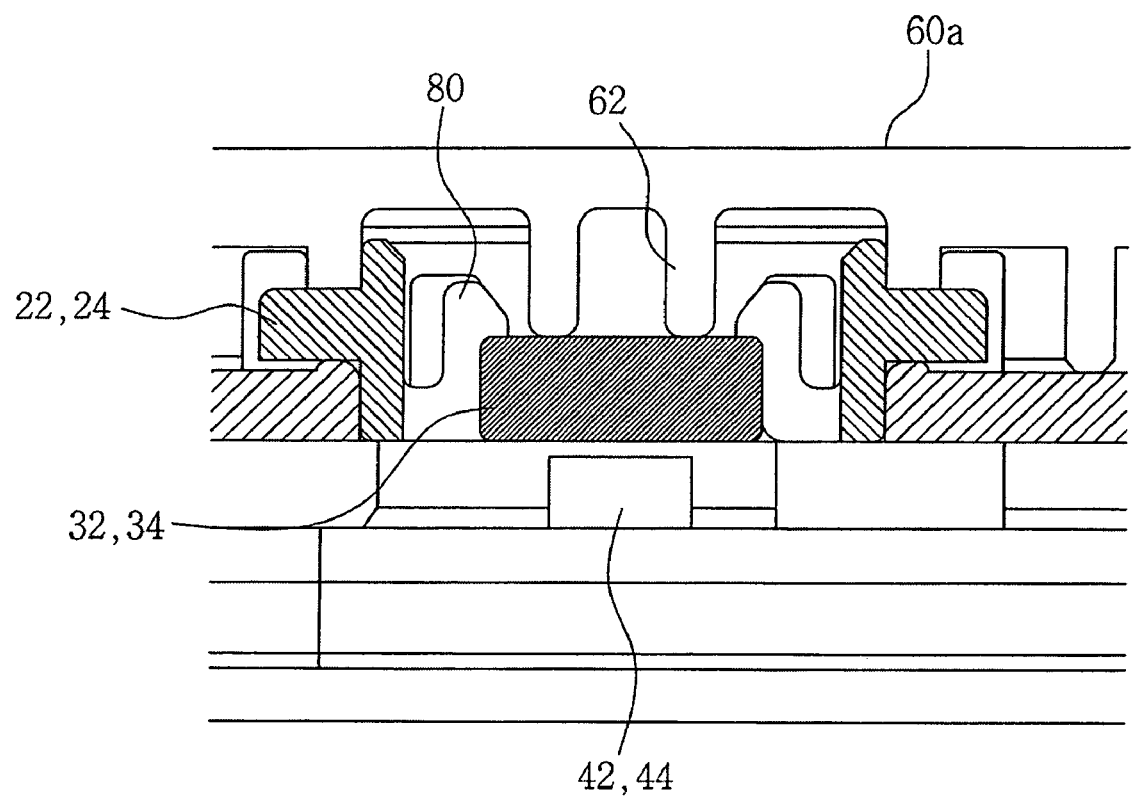
FIG. 4a is first side cross section view of assembled rotation gear and magnetic body.
Figure 4B:
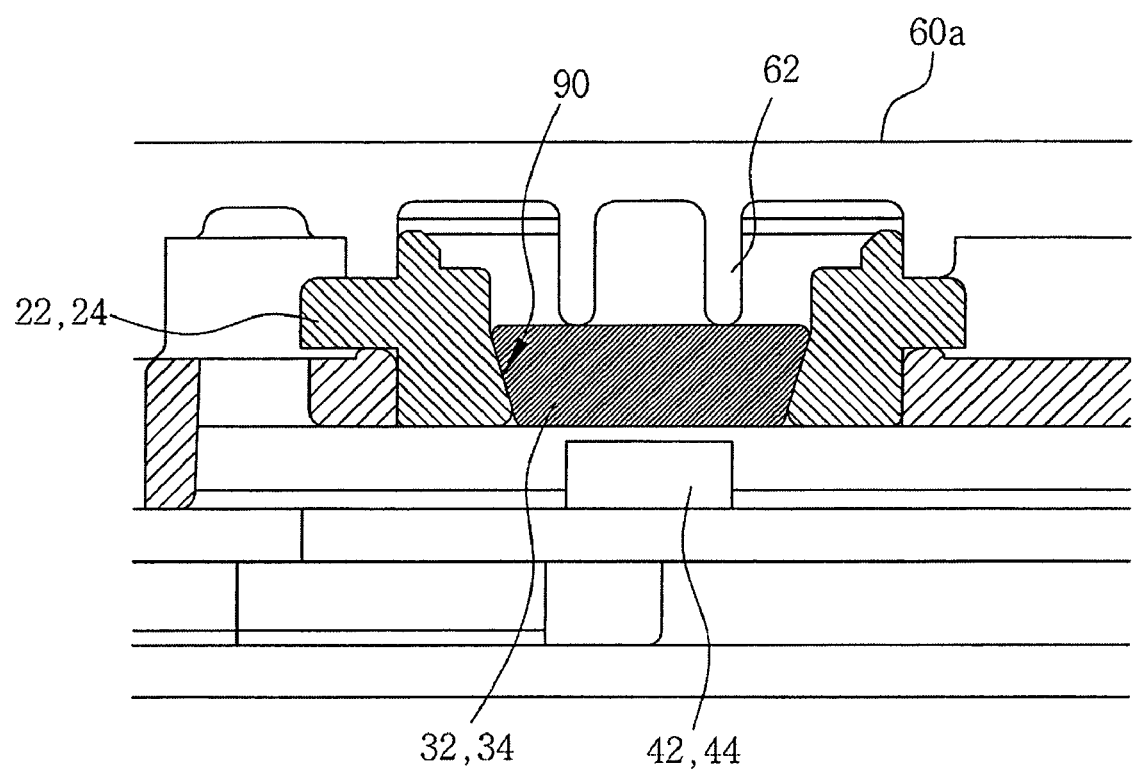
FIG. 4b is second side cross section view of assembled rotation gear and magnetic body.

As shown in FIG. 3 and FIG. 4, said first rotation gear(22) can comprise magnetic body receiving part(90) of inclined shape to receive the first magnetic body(32). Namely, inner faces of first rotation gear(22) also are formed of inclined shape to receive the first magnetic body(32) of inclined shape.

Here, by friction between inclined faces of the first magnetic body(32) and first rotation gear(22), slip of first magnetic body(32) can be prevented.

And, by forming the magnetic body in trapezoid shape and setting it into rotation gear without other fixing means preventing slipping, distance between magnetic body and sensor can be shortened, and sensing performance can be improved, and magnet with lower magnetic power can be available so manufacturing cost can be diminished.

As shown in FIG. 3*a*, said first rotation gear(22) comprises four side faces to receive said first magnetic body(32), two faces of said four faces is inclined and the other faces are vertical.

And, as shown in FIG. 3 and FIG. 4, said first rotation gear(22) comprises locking part(80) of protrusion shape to prevent said first magnetic body(32) from moving freely.

Namely, locking part(80) of protrusion shape is hanged over the first magnetic body(32) and fixing it preventing from moving freely. Said locking part(80) can be formed two at vertical side surfaces of the first rotation gear(22).

Said first rotation gear(22) receives said first magnetic body(32), and said first sensor(42) senses phase change of first magnetic body's magnetic poles(N, S) caused by rotation of first rotation gear(22).

Here, said first rotation gear(22) can be formed in one body with said first magnetic body(32), namely said first rotation gear(22) can be formed of magnetic material.

Said first rotation gear(22) goes in gear with main gear(20) and is received in the housing(60) in the state of being received in gear receiving part(70).

And, the first rotation gear(22) has different diameter from the second rotation gear(24), in this case, steering wheel's rotation angle is calculated at PCB substrate(50) on basis of difference between magnetic poles'(N, S) phase changes caused by rotation of first magnetic body(32) received in first rotation gear(22) and second magnetic body(34) received in second rotation gear(24).

Namely, when the first rotation gear(22) and second rotation gear(24) rotate, first magnetic body(32) and second magnetic body(34) received in first rotation gear(22) and second rotation gear(24) individually rotate in same rotation rate and generate sine wave signals because of phase change.

Here, diameters of first rotation gear(22) and second rotation gear(24) are different from each other, sine wave signals of first magnetic body(32) and second magnetic body have different period from each other, steering wheel's rotation angle is calculated in PCB substrate(50) on basis of sine wave signals sensed by first sensor(42) and second sensor(44).

Second rotation gear(24) goes in gear with main gear(20), and rotates to opposite direction to main gear(20).

As shown in FIG. 3 and FIG. 4, said second rotation gear(22) can comprise magnetic body receiving part(90) of inclined shape to receive the second magnetic body(34). Namely, inner faces of second rotation gear(24) also is formed of inclined shape to receive the second magnetic body(34) of inclined shape.

Here, by friction of between inclined faces of the second magnetic body(34) and second rotation gear(24), slip of second magnetic body(32) can be prevented.

And, by forming the magnetic body in trapezoid shape and setting it into rotation gear without other fixing means preventing slipping, distance between magnetic body and sensor can be shortened, and sensing performance can be improved, and magnet with lower magnetic power can be available so manufacturing cost can be diminished.

As shown in FIG. 3*a*, said second rotation gear(24) comprises four side faces to receive said second magnetic body(34), two faces of said four faces are inclined and the other faces are vertical.

And, as shown in FIG. 3 and FIG. 4, said second rotation gear(24) comprises locking part(80) of protrusion shape to prevent said second magnetic body(34) from moving freely.

Namely, locking part(80) of protrusion shape is hanged over the second magnetic body(34) and fixing it preventing from moving freely. Said locking part(80) can be formed two at vertical side surfaces of the second rotation gear(24).

Said second rotation gear(24) receives said second magnetic body(34), and said second sensor(44) senses phase change of second magnetic body's magnetic poles(N, S) caused by rotation of second rotation gear(24).

Here, said second rotation gear(24) can be formed in one body with said second magnetic body(34), namely said second rotation gear(24) can be formed of magnetic material.

Said second rotation gear(24) goes in gear with main gear(20) and is received in the housing(60) in the state of being received in gear receiving part(70).

And, the first rotation gear(22) has different diameter from the second rotation gear(24), in this case, steering wheel's rotation angle is calculated at PCB substrate(50) on basis of difference between magnetic poles'(N, S) phase change caused by rotations of first magnetic body(32) received in first rotation gear(22) and second magnetic body(34) received in the second rotation gear(24).

Namely, when the first rotation gear(22) and second rotation gear(24) rotate, first magnetic body(32) and second magnetic body(34) received in first rotation gear(22) and second rotation gear(24) individually rotate in same rotation rate and generate sine wave signals because of phase change.

Here, diameters of first rotation gear(22) and second rotation gear(24) are different from each other, sine wave signals of first magnetic body(32) and second magnetic body(34) have different period from each other, steering wheel's rotation angle is calculated in PCB substrate(50) based on sine wave signals sensed by first sensor(42) and second sensor(44).

First magnetic body(32) is set in first rotation gear(22) and rotate at same rotation rate with it, and by this rotation phase change of magnetic poles(N, S) occurs and said first sensor(42) senses magnetic power change.

Namely, said first sensor(42) senses magnetic poles' phase change caused by rotation of said first magnetic body(32).

And, said first magnetic body(32) is set in first rotation gear(22) and is received in gear receiving part(70) and in state of being received in the housing(60).

In the meanwhile, as seen in FIG. 2, said first magnetic body(32) is hexahedron which has trapezoid cross section (A-A cross section) at one side, and tetragonal cross section (B-B cross section) at the other side.

Here, some surfaces of first magnetic body(32) which has six surfaces are vertical surfaces(X) to ground surface, and other surfaces are inclined surfaces(Y).

Here, as seen in FIG. 3 and FIG. 4, inclined surfaces(Y) of first magnetic body(32) are received in magnetic body receiving part(90) formed in first rotation gear to prevent slipping of itself(32), and vertical surfaces(X) of it are received in one side of said magnetic body receiving part(90), and it can be prevented from moving freely by locking part(80).

And, said first magnetic body(32) can be set in various part of the first rotation gear(22), preferably it can be set in bottom part of the first rotation gear(22) for better sensing of first sensor(42) in PCB substrate(50).

In the meanwhile, said first magnetic body(32) can be formed in one body with said first rotation gear(22).

Second magnetic body(34) is set in second rotation gear (24) and rotates at same rotation rate with it, and by this rotation phase change of magnetic poles(N, S) is occurred and said second sensor(44) senses change of magnetic power.

Namely, said second sensor(44) senses phase change of magnetic poles(N, S) caused by rotation of said second magnetic body(34).

And, said second magnetic body is set in second rotation gear(24), and received in gear receiving part(70) and in state of being received in housing(60).

In the meanwhile, as seen in FIG. 2, said second magnetic body(34) is hexahedron which has trapezoid cross section (A-A cross section) at one side, and tetragonal cross section (B-B cross section) at the other side.

Here, some surfaces of second magnetic body(34) which has six surfaces are vertical surfaces(X) to ground surface, and other surfaces are inclined surfaces(Y).

Here, as seen in FIG. 3 and FIG. 4, inclined surfaces(Y) of second magnetic body(34) are received in magnetic body receiving part(90) formed in second rotation gear to prevent slipping of itself(34), and vertical surfaces(X) of it are received in one side of said magnetic body receiving part(90), and it can be prevented from moving freely by locking part (80).

And, said second magnetic body(34) can be set in various part of the second rotation gear(24), preferably it can be set in bottom part of the second rotation gear(24) for better sensing of first sensor(42) in PCB substrate(50).

In the meanwhile, said second magnetic body(34) can be formed in one body with said second rotation gear(24).

First sensor(42) is set in said PCB substrate(50) and senses phase change of magnetic poles(N, S) caused by rotation of said first magnetic body(32) which rotates at same rotation rate with first rotation gear(22).

Here, said PCB substrate(50) calculate steering wheel's rotation angle on basis of result from said first sensor(42).

Said first sensor(42) can be various sensor, for example, AMR(Anisotropic Magnetic Resistor) sensor or GMR(Giant Magnetic Resistor).

If said first sensor(42) is AMR sensor, it can sense more than angle of 0.1 degree, and if it is GMR sensor, it can sense more minute angle of degree.

In the meanwhile, it is preferable to set the first sensor(42) spaced from the first magnetic body(32) in the range of 0~20 millimeter(mm) to improve sensing ability.

Second sensor(44) is set in said PCB substrate(50) and senses phase change of magnetic poles(N, S) caused by rotation of said second magnetic body(34) which rotates at same rotation rate with second rotation gear(24).

Here, said PCB substrate(50) calculate steering wheel's rotation angle on basis of result from said second sensor(42).

Said second sensor(44) can be various sensor, for example, AMR(Anisotropic Magnetic Resistor) sensor or GMR(Giant Magnetic Resistor).

If said second sensor(44) is AMR sensor, it can sense more than angle of 0.1 degree, and if it is GMR sensor, it can sense more minute angle of degree.

In the meanwhile, it is preferable to set the second sensor (44) spaced from the second magnetic body(34) in the range of 0~20 millimeter(mm) to improve sensing ability.

PCB substrate(50) comprises various terminals, pins, said first sensor(42) and second sensor(44).

Here, said PCB substrate(50) is received in the housing (60), and senses phase change of magnetic poles(N, S) caused by rotation of magnetic bodies.

And, said PCB substrate(50) steering wheel's total rotation angle on basis of magnetic poles' phase change sensed from first sensor(42) and second sensor(44) by rotation of first magnetic body(32) and second magnetic body(34).

Housing(60) receives each component of steering wheel's angle sensing device and PCB substrate(50).

As seen in FIG. 1, said housing(60) is separated to upper housing(60a) and lower housing(60b), or it is also possible to form it in one body.

Figure 5:
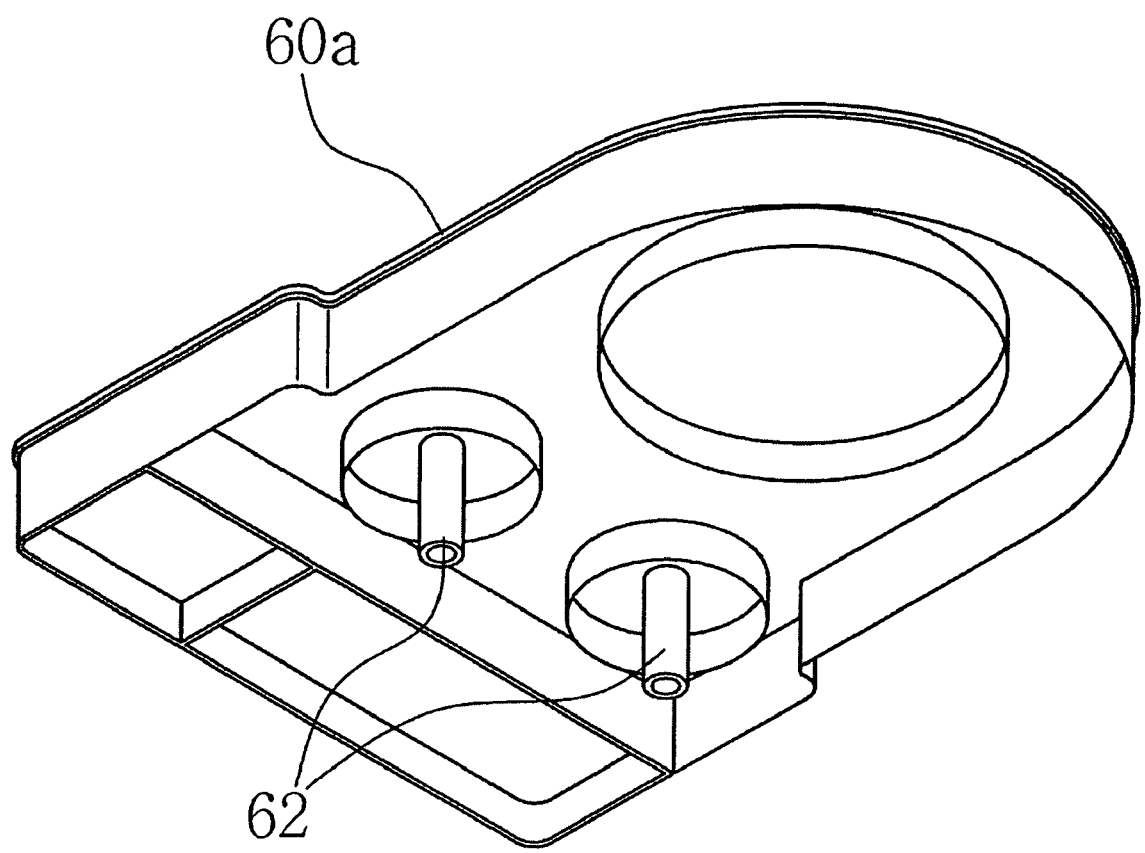
FIG. 5 is bottom view of upper housing.

As seen in FIG. 4 and FIG. 5, said upper housing(60a) comprises moving freely preventing part(62) to prevent said first magnetic body(32) and second magnetic body(34) from moving freely.

In the meanwhile, said housing(60) can be formed in various shape, and hole is formed at center of it for receiving steering shaft.

Here, the housing(60) can comprise groove or aperture for passage of wires from PCB substrate(50).

Magnetic body receiving part(90) is formed in said first rotation gear(22) and second rotation gear(24) to prevent first magnetic body(32) and second magnetic body(34) of trapezoid cross section from slipping.

As seen in FIG. 3 and FIG. 4, said magnetic body receiving part(90) is formed of inclined surfaces in the first rotation gear(22) and second rotation gear(24), and contact with inclined surfaces(Y) of said first magnetic body(32) and second magnetic body(34).

Locking part(80) is formed in protrusion shape to lock the first magnetic body(32) and second magnetic body(34) to the first rotation gear(22) and second rotation gear(24).

Here, as seen in FIG. 3 and FIG. 4, said locking part(80) can be formed at the position where vertical surfaces(X) of said first magnetic body(32) and second magnetic body(34) are located.

As seen in FIG. 1, gear receiving part(70) is formed to receive said main gear(20), first rotation gear(22), second rotation gear(24). Namely, many holes are formed in the gear receiving part(70), and the main gear(20), first rotation gear (22), second rotation gear(24) are received in the holes. In this case, rotor(10) connected with the main gear(20) is received in the gear receiving part(70).

Here, said first rotation gear(22) and second rotation gear (24) have different diameters, holes for receiving the first rotation gear(22) and second rotation gear(24) have different diameter from each other.

And, the gear receiving part(70) is formed to make it possible that the first rotation gear(22) and second rotation gear (24) can go in gear with the main gear(20).

The gear receiving part(70) is received in the housing(60) in the state of receiving the main gear(20), first rotation gear (22), second rotation gear(24), and fixes the gears to prevent them from moving freely.

Moving freely preventing part(62) is formed in upper housing(60a), and prevent the first magnetic body(32) and second magnetic body(34) from moving freely.

Here, as seen in FIG. 4 or FIG. 5, said moving freely preventing part(62) is formed at bottom surface of the upper housing(60a), and lock upper surfaces of first magnetic body (32) and second magnetic body(34), and prevent them from moving freely to vertical direction.

EXAMPLE

When vehicle's steering wheel rotates in one direction, said first rotation gear(22) and second rotation gear(24) go in gear with main gear(20) which is connected with said rotor (10), and rotate to opposite direction to the main gear(20).

And, said first magnetic body(32) and second magnetic body(34) which are set in them rotate at same rotation rate with them, and sine waves are generated by phase change of magnetic poles(N, S) rotated.

In this case, diameter of said first rotation gear(22) different from that of second rotation gear(24), and between rotation of first magnetic body(32) in first rotation gear(22) and rotation of second magnetic body(34) in second rotation gear (24), difference in magnetic poles' phase change occurs, namely difference in period.

And, sine wave from first magnetic body(32) and sine wave from second magnetic body(34) have different period from each other, said first sensor(42) and second sensor(44) sense them individually.

And, said PCB substrate(50) calculate steering wheel's rotation angle on basis of said result.

And, as seen in FIG. 6, when the steering wheel is rotated to opposite direction, between said main gear(20) and first rotation gear(22), power is not transmitted at the constant of main gear's rotation to opposite direction, because of space between gear teeth(20-1) of the main gear and gear trough (22-1) of first rotation gear(backlash).

However, in this case, gear trough(20-1) of main gear which goes in gear with second rotation gear contacts with gear teeth(24-1) of second rotation gear, so power can be transmitted without backlash at the constant of main gear's rotation to clockwise direction, namely opposite direction.

EFFECT OF INVENTION

By present invention it is possible to preventing magnetic body from moving freely to vertical direction without using adhesive agent by forming the vertical cross section shape of the magnetic body in trapezoid shape.

Also, it is possible to diminish backlash by the condition that when the gear teeth of main gear and gear trough of first rotation gear go in gear with, gear teeth of second gear are rotated by going in gear with gear trough of said main gear.

Also, it is possible to manufacturing angle sensing device without process of attaching the magnetic body to rotation gear, so total cost and time for manufacturing can be diminished.

What is claimed:

1. Vehicle's steering wheel rotation angle sensing device comprising,
   a rotor rotating in connection with steering shaft transmitting manipulation power to vehicle's wheel;
   a main gear rotating connected with said rotor;
   a first rotation gear and a second rotation gear going in gear with said main gear;
   a first magnetic body and a second magnetic body rotated in same rotation rate with the first rotation gear and the second rotation gear connected with them individually, formed in hexahedral shape in which upper surface is larger than opposite bottom surface;
   a first sensor and a second sensor sensing phase change caused by rotation of said first magnetic body and second magnetic body;
   a PCB substrate comprising said first sensor and second sensor and various terminals and pins; and
   a housing.

2. Vehicle's steering wheel rotation angle sensing device according to claim 1, wherein the vertical cross section of said first magnetic body and second magnetic body is trapezoid.

3. Vehicle's steering wheel rotation angle sensing device according to claim 2, wherein one of two vertical cross section of said first magnetic body and second magnetic body is trapezoid shape and the other is tetragonal shape.

4. Vehicle's steering wheel rotation angle sensing device according to claim 3, wherein said first rotation gear and second rotation gear comprising magnetic body receiving part individually to receive said first magnetic body and second magnetic body made in trapezoid shape of vertical cross section and to prevent them from slipping.

5. Vehicle's steering wheel rotation angle sensing device according to claim 4, wherein said first rotation gear and second rotation gear comprising individually locking part of protrusion shape to lock the received first magnetic body and second magnetic body.

6. Vehicle's steering wheel rotation angle sensing device according to claim 5, wherein said vehicle's steering wheel rotation angle sensing device further comprises gear receiving part to receive said main gear, said first rotation gear, said second gear.

7. Vehicle's steering wheel rotation angle sensing device according to claim 6, wherein said housing is divided into upper housing and lower housing.

8. Vehicle's steering wheel rotation angle sensing device according to claim 7, wherein said upper housing further comprises moving freely preventing part to prevent said first magnetic body and said second magnetic body from moving freely.

9. Vehicle's steering wheel rotation angle sensing device according to claim 8, wherein when said gear teeth of main gear go in gear with gear trough of said first rotation gear on connecting line between shaft of said main gear and shaft of said first rotation gear, said gear trough of main gear go in gear with gear teeth of said first rotation gear on connecting line between shaft of said main gear and shaft of said second rotation gear.

10. Vehicle's steering wheel rotation angle sensing device according to claim 9, wherein said PCB substrate calculates total rotation angle based on phase change of magnetic poles (N, S) caused by rotation of said first magnetic body and second magnetic body sensed by said first sensor and second sensor.

11. Vehicle's steering wheel rotation angle sensing device according to claim 10, wherein said first sensor and second sensor is AMR(Anisotropic Magnetic Resistor) sensor.

12. Vehicle's steering wheel rotation angle sensing device according to claim 11, wherein said first sensor and second sensor is GMR(Giant Magnetic Resistor) sensor.

13. Vehicle's steering wheel rotation angle sensing device according to claim 12, wherein said first sensor and second sensor is installed spaced from said first magnetic body and second magnetic body over than 0 millimeter(mm) and less than 20 millimeter(mm).

14. Vehicle's steering wheel rotation angle sensing device according to claim 12, wherein said first rotation gear and second rotation gear has different radius from each other, and generates sine wave signals of different cycle when rotates in the condition of going in gear with said main gear.

15. Vehicle's steering wheel rotation angle sensing device according to claim 12, wherein said first rotation gear and first magnetic body or said second rotation gear and second magnetic body are formed in one body.

* * * * *